Jan. 17, 1933.      C. R. OWEN      1,894,631
NUT LOCK
Filed July 18, 1930
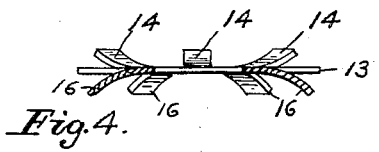
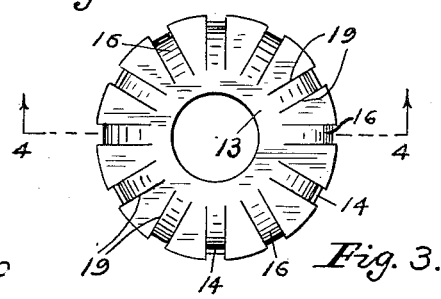
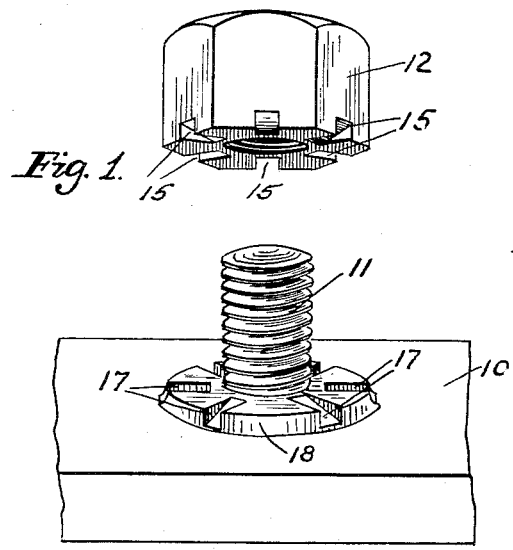
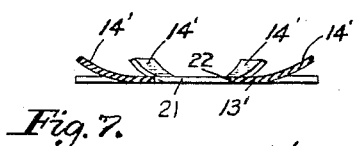
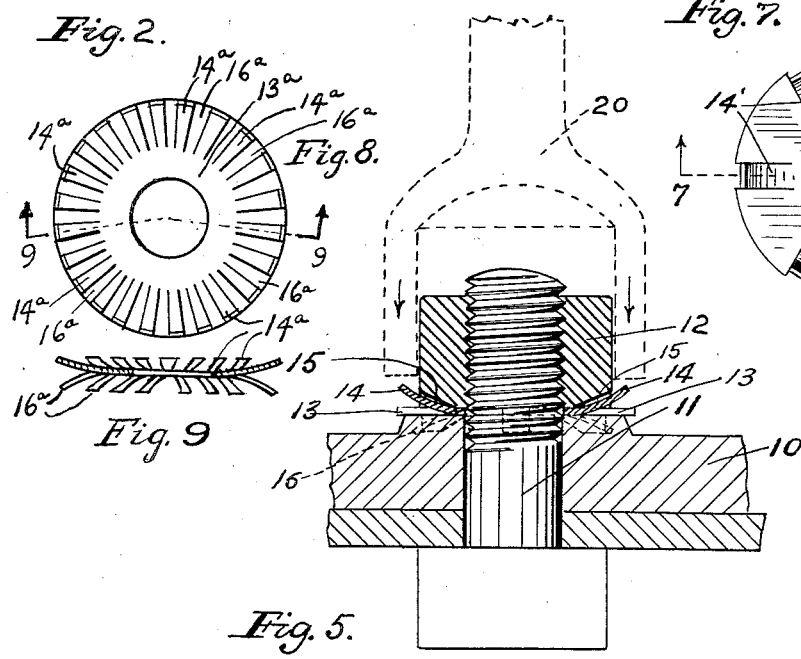
INVENTOR
CLARENCE R. OWEN
BY Reif & Braddock
ATTORNEYS Patented Jan. 17, 1933

1,894,631

UNITED STATES PATENT OFFICE

CLARENCE R. OWEN, OF MINNEAPOLIS, MINNESOTA

NUT LOCK

Application filed July 18, 1930. Serial No. 468,776.

This invention relates to a nut lock, and has for its general object to provide means of novel and improved character for effectually locking or securing a nut against accidental turning movement upon a bolt or like element and relatively to a piece of work, member, or surface, but constructed to allow the nut to be readily turned when this is intentional.

A more specific object is to provide a nut lock including a washer or similar element having means for fixing said washer or similar element against turning movement upon a bolt or like element and relatively to a piece of work, member, or surface, and also having novel and improved desirably resilient means for detachable engagement with a nut when upon said bolt or like element adapted to fix said nut against turning movement.

And a further specific object is to provide a nut lock including a washer or similar element, adapted to be placed upon a bolt or like element, having means, such as lips or tongues, offset in one direction from the washer, to holdingly engage a surface to preclude turning movement of said washer or similar element upon said bolt or like element and relatively to said surface, and having resilient means, lips or tongues, offset from said washer, at the side thereof opposite the before mentioned lips or tongues, to holdingly engage a nut upon said bolt or like element, desirably by becoming situated in depressions or slots in said nut, said resilient means, lips, or tongues which engage said nut including portions adapted to be positioned beyond the perimeter or confines of said nut to be capable of being pressed toward or to the plane of said washer or similar element, away from the nut, and thus released from said nut, as by employment of a socket wrench or some other tool which may be utilized to turn said nut upon said bolt or like element.

In the accompanying drawing forming a part of this specification.

Fig. 1 is a perspective view of a nut constructed to be locked or secured against turning movement in accordance with the invention;

Fig. 2 is a perspective view of a piece of work, member or surface in which is arranged an externally threaded element or bolt to receive the nut of Fig. 1, said member or surface being constructed according to the invention;

Fig. 3 is a plan view of the washer or similar element of the improved nut lock;

Fig. 4 is a sectional view taken on line 4—4 of Fig. 3;

Fig. 5 is a sectional view of the nut lock applied to use, disclosing in dotted lines, a socket wrench placed upon the nut;

Fig. 6 is a plan view of a modified form of washer or similar element made according to the invention;

Fig. 7 is a sectional view taken on line 7—7 of Fig. 6;

Fig. 8 is a plan view of another modified form of washer or similar element made according to the invention; and Fig. 9 is a sectional view taken on line 9—9 of Fig. 8.

With respect to Figs. 1 to 5 of the drawing, 10 denotes a piece of work, member or surface through which is inserted an externally threaded element or bolt 11 for receiving a nut 12, and 13 represents a washer or similar element adapted to be placed upon the threaded element or bolt 11, between the nut 12 and the piece of work, member or surface 10, to lock the nut against turning movement when said nut is turned home upon said threaded element or bolt and against said washer 13 and said piece of work, member, or surface 10. The threaded element or bolt 11 could, of course, be integrally fixed to the piece of work, member, or surface 10.

As very clearly disclosed in Figs. 3, 4 and 5, the washer or similar element 13 includes a series of resilient radial lips or tongues 14 offset from the plane of said washer or similar element and adapted to enter spaced apart slots or depressions 15 in the base of the nut 12. Said slots or depressions 15 are as shown arranged radially of the nut, are disposed at equal distances apart about the perimeter of said nut, and extend from the outer sides of the nut outwardly toward the adjacent end or base thereof and inwardly toward the bore of the nut.

As also very clearly disclosed in Figs. 3, 4 and 5, the washer or similar element 13 also includes a series of resilient radial lips or tongues 16 offset from the plane of said washer or similar element in direction opposite the lips or tongues 14 and adapted to enter spaced apart slots or depressions 17 in the piece of work, member, or surface 10 or in a boss 18 upon said piece of work, member, or surface. Said slots or depressions 17 are as shown arranged radially of the threaded element or bolt 11, are disposed at equal distances apart about the perimeter of said threaded element or bolt, and extend from the outer sides of the boss 18 outwardly toward the face thereof and inwardly toward the threaded member or bolt.

As shown, the resilient lips or tongues 14 and 16 are, respectively, equal in number to the slots or depressions 15 and 17 in the nut 12 and the boss 18, there being a lip or tongue 14 between each pair of lips or tongues 16 and a lip or tongue 16 between each pair of lips or tongues 14, and said lips or tongues 14 and 16 are properly spaced to all nicely enter the slots or depressions 15 and 17, respectively.

The washer or similar element 13 consists, as disclosed, of a substantially flat sheet metal disc, and the lips or tongues 14 and 16 are constructed by providing said disc of metal with slits 19 which extend substantially radially inwardly from the perimeter or circumference of said disc and terminate in spaced relation to the center opening thereof. The disc of metal 13 is of diameter greater than the diameter of the nut 12, and the outer or marginal portions of the lips or tongues 14 and 16 extend beyond the perimeter of the nut 12, see Fig. 5, to be engageable by a tool, such as a socket wrench 20, adapted to be forced against the lips or tongue 14 to press them toward or to the plane of the disc 13 to thus remove said lips or tongues 14 from the slots or depressions 15, as will be understood.

In practice, the washer or similar element 13 will be placed upon the bolt 11 so that the lips or tongues 16 engage in the slots or depressions 17 to preclude turning movement of the washer or similar element upon the bolt and relatively to the piece of work, member, or surface 10, and the nut 12 will be turned home upon the bolt, as by employment of the socket wrench 20. When the base or inner portion of the nut has reached the elevation or plane of the resilient lips or tongues 14 during the turning home operation, the tool 20 is brought into play to depress said lips or tongues 14 toward or to the plane of the disc 13, against the natural resiliency of said lips or tongues 14, and clear of the slots or depressions 15 in the nut. When the nut has been turned home the tool is withdrawn and the resilient lips or tongues 14 are thus allowed to spring into said slots or depressions 15, the nut being turned slightly to cause said lips or tongues and said slots or depressions to aline when this may be necessary. It will be evident that when the nut, washer, bolt, and member 10 are so associated with each other, said nut will be fixed against turning movement upon said bolt and relatively to the piece of work, member, or surface. However, the nut can be readily turned to be removed when the resilient lips or tongues 14 are depressed to be clear of the slots or depressions in the nut, as by employment of the socket wrench or other tool.

In Figs. 8 and 9 I have shown a modified type of washer or similar element 13a, the present washer or similar element including means, lips or tongues 14a and 16a which are equivalents of the means, lips or tongues 14 and 16 and for similar purposes, said means, lips or tongues 14a and 16a together constituting the whole of the margin of the washer or similar element 13a instead of a portion of said margin as in Figs. 3, 4 and 5.

In Figs. 6 and 7 I have shown another modified type of washer or similar element 13′. In said figures the washer or similar element includes means, lips or tongues 14′ which are the equivalent of the means, lips or tongues 14 and for a similar purpose, but in the present instance the center opening 21 of the washer includes a flat side 22 and is adapted to be fitted to a similarly shaped bolt, such as 11, or boss or member, such as 18, to be fixed against turning movement, the arrangement as shown in said Figs. 6 and 7 being a substitute, which is satisfactory in some cases, for the arrangement as in Figs. 1 to 5 for accomplishing substantially the same result. The nut lock including the washer 13′ is manipulated in the same manner as is the nut lock including the washer 13, and as already described.

As will be apparent, the lips or tongues 16 need not be resilient. However, by making these resilient, and by provision of sets of lips or tongues 14 and 16 which are approximately duplicates and similarly spaced apart, the washer of the nut lock of Figs. 1 to 5 can be reversible; that is to say, said washer can be serviceable either face up.

It is to be understood that the illustration and description herein are merely illustrative of the invention and are intended in no way in a limiting sense, changes in details of construction and arrangement of parts of the improved nut lock being permissible so long as within the spirit of the invention and the scope of the claims which follow.

What is claimed is:—

1. A nut lock comprising a metal washer adapted to be disposed about a threaded element and between a nut upon said threaded element and a member or surface in connection with which said nut and threaded element are used, said metal washer including a resilient element removably interlocking with said nut to prevent turning thereof, and said resilient element including a portion extending beyond the perimeter of said nut and adapted to be released from the nut by means of a tool fitted down over said nut, and means for fixing said metal washer against turning movement relatively to said member or surface.

2. A nut lock comprising a metal washer adapted to be disposed about a threaded element and between a nut upon said threaded element and a member or surface in connection with which said nut and threaded element are used, said metal washer including resilient tongues offset from the plane thereof and interlocking with said nut to prevent turning movement thereof, said resilient tongues including portions extending beyond the perimeter of said nut and adapted to be flexed and thus released from the nut by employment of a tool fitted down over said nut, and means for fixing said metal washer against turning movement relatively to said member or surface.

3. A nut lock comprising a metal washer adapted to be disposed about a threaded element and between a nut upon said threaded element and a member or surface in connection with which said nut and threaded element are used, said metal washer including resilient tongues struck up from the periphery thereof, said resilient tongues having portions removably interlocking with said nut to prevent turning movement thereof and portions extending beyond the periphery of the nut and in oblique relation thereto to be engaged by a tool adapted to be fitted down over said nut to flex said resilient tongues clear of said nut, and means for fixing said metal washer against turning movement relatively to said member or surface.

4. A nut lock comprising a metal washer adapted to be disposed about a threaded element and between a nut upon said threaded element and a member or surface in connection with which said nut and threaded element are used, said metal washer including resilient tongues offset from the plane thereof and removably interlocking with said nut to prevent its turning movement, and said resilient tongues including portions extending beyond the perimeter of the nut and adapted to be released from the nut by means of a tool fitted down over said nut, and resilient tongues offset from the plane of said washer and oppositely to the first mentioned resilient tongues adapted to engage said member or surface to fix said washer against turning movement relatively to said member or surface.

5. The combination of a nut having slots extending substantially radially in the botton thereof, a member or surface having slots, and a threaded element for receiving said nut and adapted to secure said member or surface and said nut to each other, with a device adapted to be disposed about said threaded element and between said nut and said member or surface for locking said nut against turning movement, said device including resilient tongues removably lying in the slots of said nut to prevent turning thereof, and said resilient tongues including portions extending beyond the perimeter of said nut and adapted to be released from the nut by a tool fitted down over said nut, and tongues upon said device lying in the slots of said member or surface for locking said device against turning movement relatively to said member or surface.

CLARENCE R. OWEN.